May 4, 1954 W. W. SPOONER 2,677,336
OVEN FOR BAKING BREAD AND LIKE PRODUCTS
Filed May 26, 1948 2 Sheets-Sheet 1
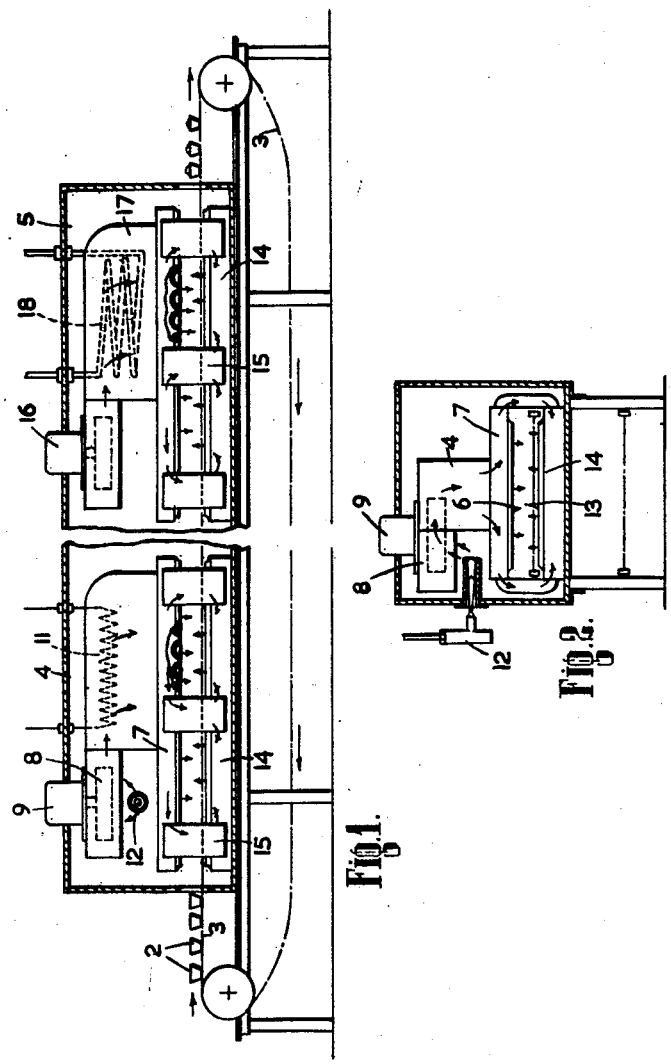
William Wycliffe Spooner
INVENTOR
BY
S. Victor Armstrong ATTORNEY May 4, 1954 W. W. SPOONER 2,677,336
OVEN FOR BAKING BREAD AND LIKE PRODUCTS
Filed May 26, 1948 2 Sheets-Sheet 2
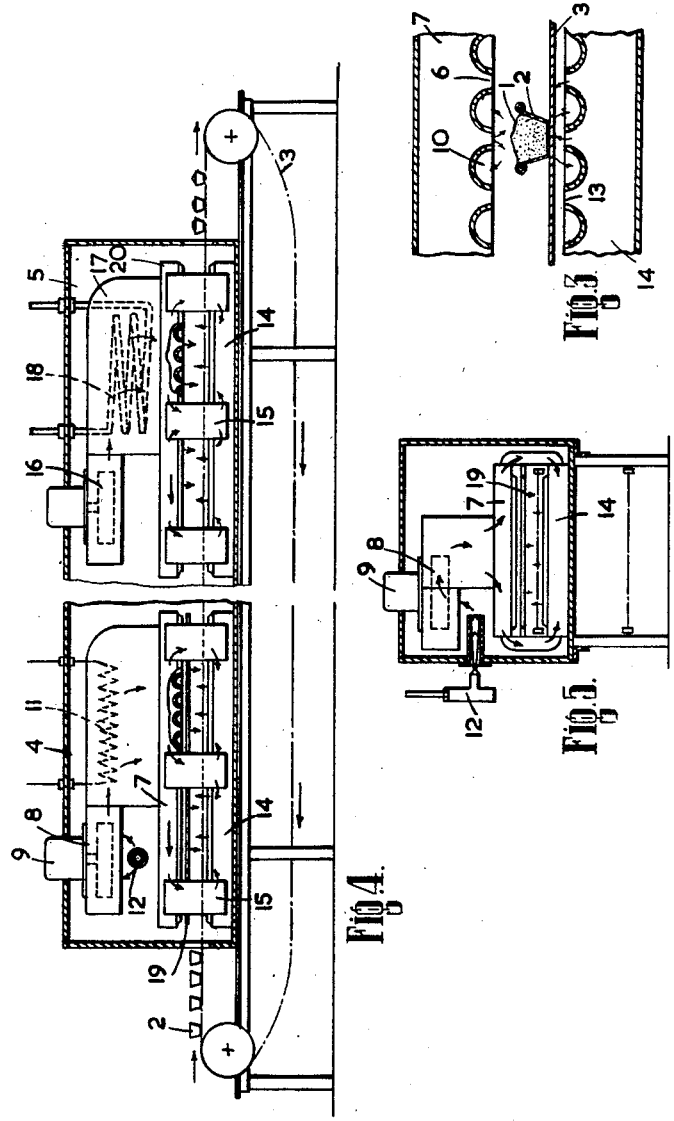

Patented May 4, 1954

2,677,336

UNITED STATES PATENT OFFICE 2,677,336

OVEN FOR BAKING BREAD AND LIKE PRODUCTS

William Wycliffe Spooner, Ilkley, England

Application May 26, 1948, Serial No. 29,364

Claims priority, application Great Britain
June 3, 1947

8 Claims. (Cl. 107—55)

The present invention relates to improvements in the manufacture of bread and the like baked products such as biscuits or confectionery.

It has been usual to bake dough lumps or pieces in the making of bread, confectionery or biscuits by the application thereto of radiant heat. This has, however, obviously necessitated the heating up of large masses of refractory or other radiant surfaces with consequent loss in efficiency.

An object of the present invention is to increase the efficiency of the baking operation and to reduce the time of such baking operation.

According to the present invention a baking oven comprises one or more chambers through which passes a common conveyor for displacing goods therethrough, at least the first one of said chambers having a heat radiant plate spaced from the conveyor, while in a contiguous chamber high velocity jets are provided for directing convection currents upon the goods on the conveyor.

The invention is further described with reference to the accompanying diagrammatic drawings showing the application to the baking of bread, by way of example, and in which:

Fig. 1 is a sectional elevation through a baking oven having a cooling chamber;

Fig. 2 is a corresponding end sectional view;

Fig. 3 is a detail view on an enlarged scale;

Fig. 4 is a view similar to Fig. 1 of a modified preferred form of arrangement; and Fig. 5 is an end sectional view corresponding to Fig. 4.

Batches of dough 1 confined in the usual baking pans 2 are conveyed continuously or step by step as they are supported upon a conveyor 3 through one or more baking chambers 4 arranged in tandem, and may then be continuously passed on one and the same conveyor 3, as shown in Fig. 1, through one or more cooling chambers 5 arranged in tandem.

Gaseous fluid streams at high velocity are directed toward the plane of the conveyor from either side thereof and are impacted upon the surface of the pans 2 and the dough batches 1 by means of jets or nozzles 6 and 13 disposed on one wall of pressure chambers 7 and 14, respectively. The nozzles or jets 6 and 13 are spaced longitudinally of the path of travel of the conveyor 3, and preferably extend at right angles to said path of travel as shown in the drawings. Pressure chamber 7 is fed from a fan 8 driven by a prime mover such as an electric motor 9 and pressure chambers 14 receive the compressed hot gaseous fluid through transfer ducts 15 as shown in Fig. 1. The high velocity streams, after impacting on the goods, are led away along passages 10 between the jets and back to the inlet of the fan 8, heat being imparted to the gaseous streams to make up for lost energy by, for instance, electric resistance elements indicated diagrammatically at 11. Where, however, heat is supplied primarily by gas burners such as 12, it will be necessary to draw in air from the atmosphere to maintain combustion, in which case the added heat, such as that of the resistance elements 11, may not be necessary.

After the bread has been baked as above indicated, the pans 2 may be transferred to any desired form of cooling arrangement, or one or more cooling chambers such as 5 may be disposed in tandem with one or more baking chambers such as 4, in which case the gaseous fluid streams impacting on the pans 2 and on the dough therein, or upon the conveyor 3 respectively, will be cool air or gas which is similarly circulated in a closed cycle by means of the fan or impeller 16, the pressure chamber 17 of which may include refrigeration coils such as diagrammatically indicated at 18.

In the preferred form of construction shown in Figs. 4 and 5, the gaseous fluid streams are not impacted upon the goods 1 or the pans 2 from above during the initial portion of the conveyor travel but are directed upon plates 19 of thin sheet material attached to and heat insulated from the walls of the baking oven 4 by any suitable means, not shown, in which case the goods 2 will be heated by radiant heat from the plates 19.

The jets 6 and 13 may be formed in the wall of the chambers 7, 14 and 20 respectively, and are preferably substantially of Venturi shape to convert the pressure energy of the gaseous fluid in the chambers 7, 14 and 20 respectively into kinetic energy.

By this means it will be found that an efficient baking of the bread or other baked products can be obtained in a very short time and with a better heating efficiency, it being found in practice that baking can take place where the air or gas streams are at a temperature of 350° F. to 375° F.

In the cooling of the baked products the cooling streams are preferably maintained with a predetermined moisture content, so that the crust of the loaves or other baked products does not become cracked.

I have found that in the cooling of baked products an increased efficiency is obtained by using cooling streams at 60° F. or less impinging directly upon the baked products, and that where baked products such as bread were so subjected, it could be cooled down in a period of 1 hour to roughly 80° F., with the further advantage that the phenomenon known as "rope" was eliminated from the finished product, and, moreover, that the finished product was less liable to the development of mould than with previous baking methods as above.

Further, where it is desired to produce a desired finish of crust upon the loaf of bread in a container or supported upon a plate or conveyor, water, oil, fat or other medium may be applied to part or the whole of the outer surface of the dough mass prior to its being baked, it being found that a thin liquid film of water, by way of example, on the top surface of the bread gives a crust of a very desirable appearance.

Particularly where the loaf is disposed within a baking tin, the upper surface of which is arranged in close disposition to a heat radiating plate, it has been found that the water, oil or fat film so applied to the top surface of the loaf in vaporizing has difficulty in escaping and circles around the top surface of the loaf to give the desired effect to the baked product.

I declare that what I claim is:

1. A baking oven comprising a casing enclosing a baking chamber, an oven conveyor extending through said baking chamber, at least one pair of opposed pressure chambers, one above and one below the conveyor, with nozzles formed in the walls thereof facing the conveyor, a fan communicating at its inlet side with said baking chamber and at its discharge side with said pressure chambers to cause a heated fluid to circulate in a closed circuit through the fan to said pressure chambers, through the pressure chamber nozzles into the baking chamber towards the conveyor and thence back to the fan, means located in the vicinity of the closed circuit of the circulating fluid for heating the fluid, and a metallic shield extending over at least an initial portion of the path of travel of the conveyor through the baking chamber and located between the upper pressure chamber and the conveyor, said metallic shield being of heat conducting material whereby the heating fluid from the nozzles is prevented from impinging directly upon the dough products and made to heat the metallic shield to cause the dough products to be baked more slowly in the initial part of the path of travel of the conveyor through the baking chamber than in a later part of said path of travel.

2. A baking oven as claimed in claim 1 wherein the means for heating the fluid comprises an electric resistance element in said closed circuit.

3. A baking oven as claimed in claim 1 wherein the means for heating the fluid comprises a burner directed into said closed circuit.

4. A baking oven comprising a casing enclosing a baking chamber, an oven conveyor extending through said baking chamber, a plurality of pairs of opposed pressure chambers, one pressure chamber of each pair located above and the other pressure chamber of each pair located below the conveyor with nozzles formed in the walls thereof facing the conveyor, a fan communicating at its inlet side with said baking chamber and at its discharge side with said pressure chambers to cause heated fluid to circulate in a closed circuit through the fan to said pressure chambers, through the pressure chamber nozzles into the baking chamber towards the conveyor and thence back to the fan, means located in the vicinity of the closed circuit of the circulating fluid for heating the fluid, and a metallic shield located between the upper pressure chamber of at least the first pair of pressure chambers and the conveyor, said metallic shield being of heat conducting material whereby the heating fluid from the nozzles is prevented from impinging directly upon the dough products and made to heat the metallic shield to cause the dough products to be baked more slowly in the initial part of the path of travel of the conveyor through the baking chamber than in a later part of said path of travel.

5. A baking oven comprising a plurality of baking chambers, an oven conveyor extending through said baking chambers, at least one pair of opposed pressure chambers, one above and one below the conveyor in each of said baking chambers, nozzles formed in the walls of said pressure chambers facing the conveyor, a fan communicating at its inlet side with said baking chamber and at its discharge side with said pressure chambers to cause a heated fluid to circulate in a closed circuit through the fan to said pressure chambers, through the pressure chamber nozzles into the baking chamber towards the conveyor and thence back to the fan, means located in the vicinity of the closed circuit of the circulating fluid for heating the fluid, and a metallic shield located between the upper pressure chamber and the conveyor of at least the first pair of pressure chambers of the first baking chamber, said metallic shield being of heat conducting material whereby the heating fluid from the nozzles is prevented from impinging directly upon the dough products and made to heat the metallic shield to cause the dough products to be baked more slowly in the initial part of the path of travel of the conveyor through the baking chamber than in a later part of said path of travel.

6. A baking oven comprising a casing enclosing a baking chamber, an oven conveyor extending through said baking chamber, at least one pair of opposed pressure chambers, one above and one below the conveyor each with a plurality of nozzles formed in the walls thereof facing the conveyor, said nozzles being of slit-like form and extending across the path of travel of the conveyor and being spaced from one another in the longitudinal direction of the conveyor, a fan communicating at its inlet side with said baking chamber and at its discharge side with said pressure chambers to cause a heated fluid to circulate in a closed circuit through the fan to said pressure chambers, through the pressure chamber nozzles into the baking chamber towards the conveyor in the form of a plurality of streams and thence back to the fan, means located in the vicinity of the closed circuit of the circulating fluid for heating the fluid, and a metallic shield extending over at least an initial portion of the path of travel of the conveyor through the baking chamber and located between the upper pressure chamber and the conveyor, said metallic shield being of heat conducting material whereby the heating fluid from the nozzles is prevented from impinging directly upon the dough products and made to heat the metallic shield to cause the dough products to be baked more slowly in the initial part of the path of travel of the conveyor through the baking chamber than in a later part of said path of travel.

7. An apparatus for baking dough products comprising a conveyor, means to move said conveyor in a substantially horizontal path throughout a portion of its travel, spaced apart opposed upper and lower walls, said substantially horizontal path of conveyor travel being located between said upper and lower walls and said walls having means therein to direct heated fluid toward said conveyor as it travels along said substantially horizontal path of travel, means to force said heated fluid through said directing means, means to recirculate said heated fluid, and a plate of heat conductive material located between said conveyor and said upper heated fluid directing means throughout an initial portion of said horizontal path of travel whereby said conveyor is shielded during said initial portion of travel from heated fluid coming from above it but is subject to radiant heat from said plate.

8. An apparatus for baking dough products comprising a conveyor, means to move said conveyor in a substantially horizontal path throughout a portion of its travel, spaced apart opposed upper and lower walls, said substantially horizontal path of conveyor travel being located between said upper and lower walls and said walls having nozzles extending across and spaced longitudinally of said path of travel to direct heated fluid toward said conveyor as it travels along said substantially horizontal path of travel, means to force said heated fluid through said directing nozzles, means to recirculate said heated fluid, and a plate of heat conductive material located between said conveyor and said upper heated fluid directing nozzles throughout an initial portion of said horizontal path of travel whereby said conveyor is shielded during said initial portion of travel from heated fluid coming from above it but is subject to radiant heat from said plate.

References Cited in the file of this patent

UNITED STATES PATENTS

| Number | Name | Date |
|---|---|---|
| 1,488,252 | House | Mar. 25, 1924 |
| 1,799,844 | De Coriolis | Apr. 7, 1931 |
| 1,890,681 | Hoppe | Dec. 13, 1932 |
| 1,971,766 | Byron et al. | Aug. 28, 1934 |
| 2,139,448 | Gantvoort | Dec. 6, 1938 |
| 2,257,487 | Tenney | Sept. 30, 1941 |
| 2,340,354 | Wells | Feb. 1, 1944 |
| 2,431,207 | Stephens | Nov. 18, 1947 |
| 2,445,884 | MacManus | July 27, 1948 |
| 2,454,370 | De Gaepe Beaubien | Nov. 23, 1948 |
| 2,491,687 | Nutt | Dec. 20, 1949 |
| 2,559,713 | Dunski et al. | July 10, 1951 |

FOREIGN PATENTS

| Number | Country | Date |
|---|---|---|
| 573,457 | Great Britain | Nov. 21, 1945 |